3,242,169
6α - DIMETHYLAMINOMETHYL - 3 - OXO - Δ⁴ - STEROIDS AND METHOD FOR PRODUCING SAME
Vladimir Petrow, London, England, assignor to The British Drug Houses Limited
No Drawing. Filed Oct. 21, 1963, Ser. No. 317,774
Claims priority, application Great Britain, Oct. 30, 1962, 40,985/62
10 Claims. (Cl. 260—239.55)

This invention is for improvements in or relating to organic compounds, and has particular reference to a new class of steroidal $\Delta^4$-3-ones, substituted in the 6-position by dialkylaminomethyl grouping and in particular by a dimethylaminomethyl grouping.

It is an object of the present invention to provide a new class of steroidal $\Delta^4$-3-ones substituted in the 6-position by a dialkylaminomethyl grouping including Formula I below which compounds are of value on account of their biological properties and as intermediates for the preparation of compounds having valuable biological properties. An important feature of the compounds of the present invention is their ability to form water-soluble salts with acids.

The invention provides the following specific new 6-dimethylaminomethyl-3-oxo-$\Delta^4$-steroids 6α-dimethylaminomethyl testosterone acetate, which is of value on account of its anabolic/androgenic properties 17α-acetoxy-6α-dimethylaminomethylprogesterone and the 16-methylene derivative thereof which are of value on account of their progestational properties 6α-dimethylaminomethyl-16α,17α-isopropylidene-dioxy-pregn-4-ene-3,20-dione which is of value on account of its progestational properties.

According to the present invention there is provided a process for the preparation of 6-dimethylaminomethyl-3-oxo-$\Delta^4$-steroids including the general formula

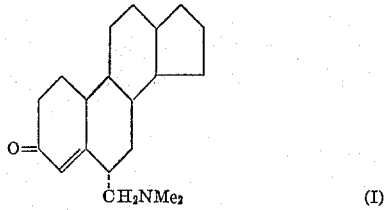

(I)

which process comprises reacting the corresponding 3-enol ether including the general formula

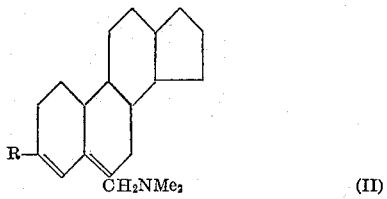

(II)

where R is O-alkyl, O-hydroxyalkyl, O-cycloalkyl or O-aralkyl with more than one equivalent proportion of an acid.

In carrying the process of this invention into effect, the 3-enol ether of the 6-dimethylaminomethyl-3-oxo-$\Delta^4$-steroid (II) may be dissolved or suspended in a solvent, such as acetic acid, and somewhat more than one equivalent proportion of a fairly strong acid, preferably with dissociation constant ($pK_a$, in water) less than 2.0, is added. The mixture may be allowed to stand at room temperature until conversion into the 3-oxo-$\Delta^4$-steroid (I) is complete, the reaction-time required depending upon the nature and concentration of the acid employed. Thereafter, the mixture is made alkaline to precipitate the 3-oxo-$\Delta^4$-steroid (I) which may be recovered by filtration or extraction with a suitable solvent, and subsequently purified by methods well known to those skilled in the art. Alternatively, the 3-enol ether (II) may be dissolved, at room temperature, in an excess of an aqueous inorganic acid, such as hydrochloric acid, under which conditions conversion into the 3-oxo-$\Delta^4$-steroid (I) may occur relatively rapidly. The mixture is then rendered alkaline, and the project (I) isolated.

The process of the invention may be applied to the 6-dimethylaminomethyl-3-enol ether derivatives of androstane, D-homoandrostane, 19-norandrostane, pregnane, D-homopregnane and 19-norpregnane.

The following additional groups will not, in general, interfere with the process of the invention:

Hydroxy or acyloxy groups at positions such as C–11, 16, 17, 20 and 21, although such acyloxy groups may possibly undergo complete or partial hydrolysis.

Oxo groups at positions such as C–11, 17 and 20.

Alkyl groups containing up to four carbon atoms, and in particular methyl groups, at positions C–1, 7, 11, 16, 17 and 21.

Halogeno groups at positions C–9, 11, 16, 17 and 21.

Isopropylidenedioxy at positions 16–17 in 20-oxo pregnanes.

Bismethylenedioxy at position 17α,20:20,21 and unsaturated linkages [other than those at 3(4),5(6)].

The preparation of the starting materials of the present invention is described in our Belgian Patent No. 614,258 and United States counterpart No. 3,084,159 and the present invention may be applied to series listed therein.

Following is a description by way of example of methods of carrying the invention into effect.

*Example 1.—6α-dimethylaminomethyl testosterone acetate*

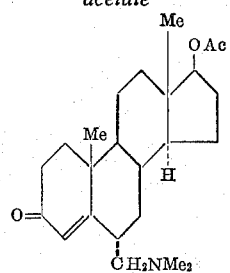

A suspension of 6-dimethylaminomethyl testosterone acetate 3-enol ethyl (or methyl) ether (10 g.) in acetic acid (20 ml.) was treated with concentrated hydrochloric acid (3 ml., 1.3 equivalents), and the mixture set aside for 1 hour at room temperature. Water (100 ml.) was added to give a slightly turbid solution, the mixture was extracted with ether, and the aqueous phase was rendered alkaline by addition of concentrated aqueous ammonia. The precipitate was isolated with ether and purified from aqueous methanol to give 6α-dimethylaminomethyl testosterone acetate, needles, M.P. 178 to 180° C., $[\alpha]_D^{25}$ +62.5° (c. 0.94 in chloroform), $\lambda_{max.}$ 239 m$\mu$ (log $\epsilon$ 4.15).

*Example 2.—17α-acetoxy-6α-dimethylaminomethyl progesterone*

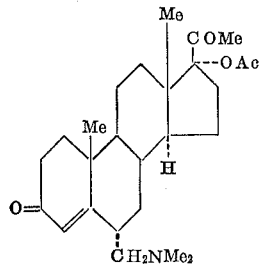

17α - acetoxy - 6 - dimethylaminomethyl progesterone 3-enol ethyl ether (0.5 g.) was dissolved in concentrated hydrochloric acid (5 ml.) and the solution diluted with water (5 ml.). After 15 minutes at room temperature, the mixture was poured into an excess of aqueous sodium carbonate, and the precipitate collected by filtration and crystallised from acetone-hexane. 17α-acetoxy-6α - dimethylaminomethyl progesterone separated in prisms, M.P. 190–192° C., $[α]_D^{26}$ +37° (c. 0.86 in chloroform), $λ_{max}$. 239.5 mμ (log ε 415).

*Example 3.—17α-acetoxy-6α-dimethylaminomethyl-16-methylenepregn-4-ene-3,20-dione*

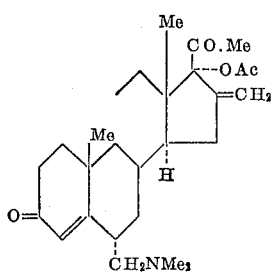

17α - acetoxy - 6 - dimethylaminomethyl - 3 - methoxy-16-methylenepregna-3,5-dien-20-one (1 g.) was treated with concentrated hydrochloric acid (5 ml.) and water (10 ml.), and the mixture set aside at room temperature for 20 minutes. Addition of excess aqueous sodium hydroxide gave a precipitate which was isolated with methylene dichloride and purified from acetone-hexane. 17α - acetoxy - 6α - dimethylaminomethyl - 16 - methylenepregn-4-ene3,20-dione separated in crystals, $λ_{max}$. 239.5 mμ (log ε 4.15).

*Example 4.—6α-dimethylaminomethyl-16α,17α-isopropylidenedioxypregn-4-ene-3,20-dione*

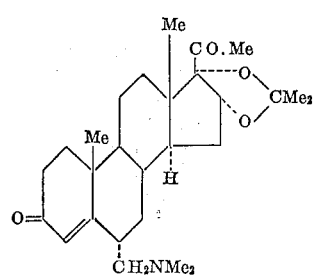

6 - dimethylaminomethyl - 3 - ethoxy - 16α,17α - isopropylidenedioxypregna - 3,5 - dien - 20 - one (700 mg.) was treated for 10 minutes with a mixture of concentrated sulphuric acid (1 ml.) and water (10 ml.). After addition of excess alkali, the product was isolated with ether and purified from aqueous ethanol, to give 6α-dimethylaminomethyl - 16α,17α - isopropylidenedioxypregn-4-ene-3,20-dione, crystals, $λ_{max}$. 239.5 mμ (log ε 4.14).

*Example 5.—6α-dimethylaminomethyl cortisone acetate*

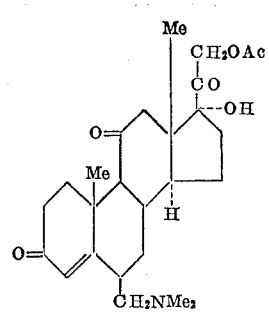

6-dimethylaminomethyl cortisone acetate 3-enol ethyl ether (1 g.) in acetic acid (10 ml.) was treated with concentrated hydrochloric acid (0.4 ml.) and the mixture set aside at room temperature for 45 minutes. It was poured into excess aqueous alkali and the product collected by filtration. Purification from acetone-hexane gave 6α-dimethylaminomethyl cortisone acetate, crystals, $λ_{max}$. 238 mμ (log ε 4.16).

*Example 6.—6α-dimethylaminomethylandrost-4-ene-3,17-dione*

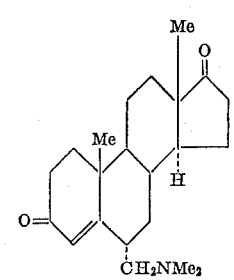

3 - ethoxy - 6 - dimethylaminomethylandrosta - 3,5-dien-17-one (1 g.) was treated with concentrated hydrochloric acid (5 ml.) and water (10 ml.), and the mixture set aside for 15 minutes. The precipitate obtained by the addition of aqueous sodium hydroxide was filtered, washed, and purified from aqueous methanol. 6α-dimethylaminomethylandrost - 4 - ene - 3,17 - dione formed crystals, $λ_{max}$. 239 mμ (log ε 4.15).

*Example 7.—21-acetoxy-6α-dimethylaminomethyl-17α-hydroxypregna-4,9(11)-diene-3,20-dione*

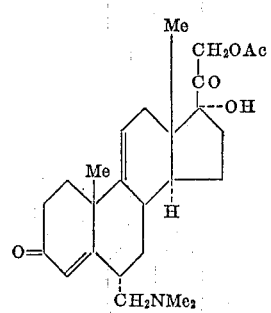

The procedure of Example 5 was applied to 21-acetoxy-17α - hydroxy - 3 - methoxy - 6 - dimethylaminomethyl-pregna-3,5,9(11)-trien-20-one. The product was 21-acetoxy - 6α - dimethylaminomethyl - 17α - hydroxypregna - 4,9(11) - diene - 3,20 - dione, which separated from acetone-hexane in crystals, $λ_{max}$. 240 mμ (log ε 4.15).

*Example 8.—6α-dimethylaminomethyl-19-norandrost-4-ene-3,17-dione*

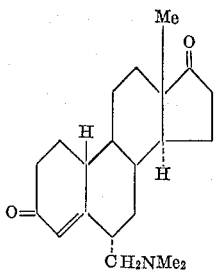

The procedure of Example 6 was applied to 6-dimethylaminomethyl - 3 - methoxy - 19 - norandrosta - 3,5-diene-17-one. The product was 6α-dimethylaminomethyl-19-norandrost-4-ene-3,17-dione, which was purified from aqueous methanol. It formed crystals, $\lambda_{max}$. 239.5 m$\mu$ (log $\epsilon$ 4.14).

*Example 9.—6α-dimethylaminomethyl hydrocortisone 21-acetate*

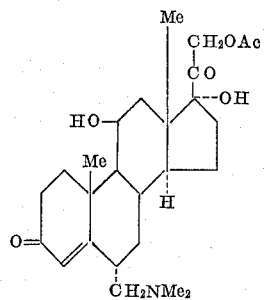

The procedure of Example 5 was applied to 6-dimethylaminomethyl hydrocortisone 21-acetate 3-enol ethyl ether. The produce, 6α-dimethylaminomethyl hydrocortisone 21-acetate, was purified from acetone-hexane to give crystals, $\lambda_{max}$. 239 m$\mu$ (log $\epsilon$ 4.15).

I claim:
1. A compound selected from the group consisting of:

A.

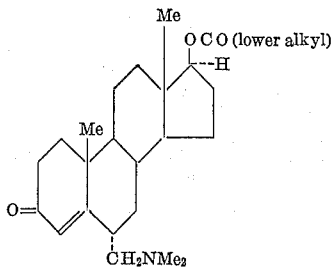

B.

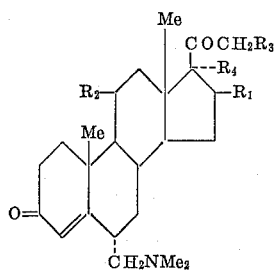

C.

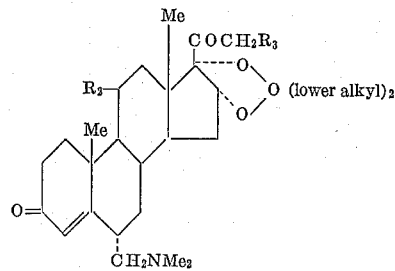

D.

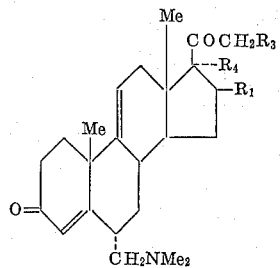

and

E.

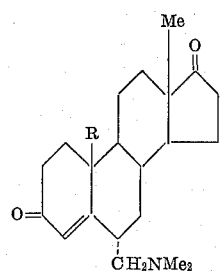

wherein—
R is selected from the group consisting of hydrogen and methyl,
$R_1$ is selected from the group consisting of hydrogen and methylene,
$R_2$ is selected from the group consisting of hydrogen, oxo and β-hydroxyl,
$R_3$ is selected from the group consisting of hydrogen, hydroxyl and —OCO (lower alkyl), and
$R_4$ is selected from the group consisting of hydroxy and —OCO (lower alkyl).

2. 6α-dimethylaminomethyl testosterone acetate.
3. 17α-acetoxy-6α-dimethylaminomethyl progesterone.
4. 17α - acetoxy - 6α - dimethylaminomethyl - 16-methylenepregn-4-ene-3,20-dione.
5. 6α - dimethylaminomethyl - 16α,17α - isopropylidenedioxypregn-4-ene-3,20-dione.
6. 6α-dimethylaminomethyl cortisone acetate.
7. 6α - dimethylaminomethylandrost - 4 - ene - 3,17-dione.
8. 21 - acetoxy - 6α - dimethylaminomethyl - 17α-hydroxypregna-4,9(11)-diene-3,20-dione.
9. 6α - dimethylaminomethyl - 19 - norandrost - 4-ene-3,17-dione.
10. 6α-dimethylaminomethyl hydrocortisone 21-acetate.

References Cited by the Examiner
UNITED STATES PATENTS
3,040,035  6/1962  Petrow et al. _____ 260—397.4
3,061,617  10/1962  Nomine et al. _____ 260—397.4

LEWIS GOTTS, *Primary Examiner.*